(12) United States Patent
Harik

(10) Patent No.: US 10,015,934 B2
(45) Date of Patent: Jul. 10, 2018

(54) PLANT PROTECTION/DEER EXCLUSION ENCLOSURE

(71) Applicant: Ramsay Harik, Bloomington, IN (US)

(72) Inventor: Ramsay Harik, Bloomington, IN (US)

( * ) Notice: Subject to any disclaimer, the term of this patent is extended or adjusted under 35 U.S.C. 154(b) by 229 days.

(21) Appl. No.: 15/060,757

(22) Filed: Mar. 4, 2016

(65) Prior Publication Data

US 2017/0251610 A1  Sep. 7, 2017

(51) Int. Cl.
*A01G 13/04* (2006.01)

(52) U.S. Cl.
CPC .................................. *A01G 13/04* (2013.01)

(58) Field of Classification Search
CPC ........ A01G 9/126; A01G 9/128; A01G 13/04; A01G 17/06; A01G 17/08; E04H 17/161; E04H 17/24
USPC ....... 47/31, 32.5, 44, 45; 256/25, 45, 47, 54, 256/57; 403/397
See application file for complete search history.

(56) References Cited

U.S. PATENT DOCUMENTS

| | | | | |
|---|---|---|---|---|
| 1,464,801 A * | 8/1923 | Beers | ...................... | B65F 1/141 220/493 |
| 1,739,426 A * | 12/1929 | Stripling | ................. | A01G 13/04 47/31 |
| 2,191,808 A * | 2/1940 | Schramm | ................... | G09F 3/14 248/230.8 |
| 3,041,783 A * | 7/1962 | Pezdek | ................... | A01G 17/06 47/44 |
| 5,233,788 A * | 8/1993 | Jackson, Jr. | ........ | A01G 13/0237 47/31 |
| 5,544,446 A * | 8/1996 | Benson, Jr. | .............. | A01G 9/12 220/6 |
| 5,784,762 A * | 7/1998 | Huntting | ................ | A01G 17/08 24/115 R |
| 6,067,752 A * | 5/2000 | Bryan | ..................... | A01G 13/10 47/47 |
| 6,385,901 B1 * | 5/2002 | Wahlberg | .................. | A01G 9/12 256/47 |
| 7,740,233 B1 * | 6/2010 | Larsen | .................. | E04H 17/163 256/24 |
| 7,984,585 B1 * | 7/2011 | Wu | .......................... | A01G 9/12 47/45 |
| 2008/0256856 A1 * | 10/2008 | Rosaen | ..................... | A01G 9/12 47/45 |
| 2009/0183428 A1 * | 7/2009 | Agullo | .................... | A01G 9/128 47/44 |
| 2013/0125457 A1 * | 5/2013 | Pennors | .................... | A01G 9/12 47/44 |

(Continued)

*Primary Examiner* — Joshua Daniel Huson
*Assistant Examiner* — Brady W Frazier
(74) *Attorney, Agent, or Firm* — Liell & McNeil

(57) ABSTRACT

A plant protection/deer exclusion enclosure includes a segment of fencing formed into an overlapping spiral configuration to define a variable diameter enclosed cylindrical volume that protects a plant from browsing or rubbing by deer. The overlapping spiral configuration is characterized by the first column of rectangular openings of the fencing being positioned radially outside, and in superimposed alignment with, the last column of rectangular openings. A plurality of fasteners contact both the first and second side wires of the rectangular openings in both the first column and the second column to provide structural integrity, especially in the attachment portion, of the enclosed cylindrical volume.

13 Claims, 3 Drawing Sheets

(56) References Cited

U.S. PATENT DOCUMENTS

| | | | |
|---|---|---|---|
| 2013/0283682 A1* | 10/2013 | Patoskie | A01G 9/12 47/45 |
| 2014/0259901 A1* | 9/2014 | Williams | A01G 13/10 47/31 |
| 2015/0245567 A1* | 9/2015 | Falk | A01G 17/06 47/45 |
| 2015/0289454 A1* | 10/2015 | Legus | A01G 9/12 47/45 |
| 2015/0342131 A1* | 12/2015 | Torres Carpio | A01G 17/04 47/44 |

* cited by examiner

US 10,015,934 B2

PLANT PROTECTION/DEER EXCLUSION ENCLOSURE

TECHNICAL FIELD

The present disclosure relates generally protecting plants and shrubs from destruction by deer, and more particularly to a segment of fence formed into an enclosed cylindrical volume by a plurality of fasteners.

BACKGROUND

With the continued expansion of deer populations into residential areas, damage to plants is a very real and growing problem for homeowners and gardeners. Small trees, shrubs and other plants are vulnerable to deer browsing when they have foliage accessible to deer, which is typically in the range from about ground level up to about 4 feet. Furthermore, in autumn, male deer may rub antlers against exposed tree trunks of small diameter trees often causing fatal bark damage. While it is true that deer generally avoid certain trees and shrubs under normal circumstances, their willingness to browse depends upon food availability, season and the tastes of particular deer.

One current strategy for dealing with deer browsing has been the use of repellents with a great range and variety of odors, tastes and scare devices. Their effectiveness is limited due to the quick habituation deer make to changing conditions. Sprays also require frequent reapplication, and the damage done between a heavy rain and a re-spraying can be devastating. Many homeowners have come to recognize that physical barriers offer the only reliable method for protecting gardens and landscapes from deer browsing.

The present disclosure is directed toward one or more of the problems set forth above.

SUMMARY

In one aspect, a plant protection/deer exclusion enclosure includes a segment of fencing that defines a grid of rectangular openings. The segment of fencing has an overlapping spiral configuration that defines an enclosed cylindrical volume with a height that is greater than a diameter. The grid includes a plurality of columns of rectangular openings bound on one end by a first column and bound on an opposite end by a last column. The overlapping spiral configuration includes the first column being positioned radially outside, and in superimposed alignment with, the last column. A plurality of fasteners connect the first column to the last column in the superimposed alignment. Each of the rectangular openings is defined by a first side wire, a second side wire, a top wire and a bottom wire. Each of the fasteners is in contact with the first side wire and second side wire of a rectangular opening of the first column and also in contact with the first side wire and the second side wire of a rectangular opening of the last column.

In another aspect, a plant protection/deer exclusion enclosure includes a segment of fencing that defines a grid of rectangular openings. The segment of fencing has an overlapping spiral configuration that defines an enclosed cylindrical volume with a height that is greater than a diameter. The grid includes a plurality of columns of rectangular openings bound on one end by a first column, and bound on an opposite end by a last column. The overlapping spiral configuration includes the first column being positioned radially outside, and in superimposed alignment with, the last column in a large diameter configuration. The overlapping spiral configuration includes the first column being positioned radially outside, and in superimposed alignment with, one of the columns other than the last column in one of an integer number of smaller diameter configurations. A plurality of fasteners are affixed to the first column and removably attached to the last column and one of the columns other than the last column in the large diameter configuration and one of the smaller diameter configurations, respectively. Each of the rectangular openings is defined by a first side wire, a second side wire, a top wire and a bottom wire. Each of the fasteners is an integral single component with a shape that is symmetrical about two perpendicular axes, and includes first and second extensions connected to a cross piece by first and second living hinges, respectively. At least three ground attachment stakes are affixed to a ground contact edge of the fencing. The overlapping spiral configuration is limited to the large diameter configuration and the integer number of smaller diameter configurations.

DETAILED DESCRIPTION

Figure 1:
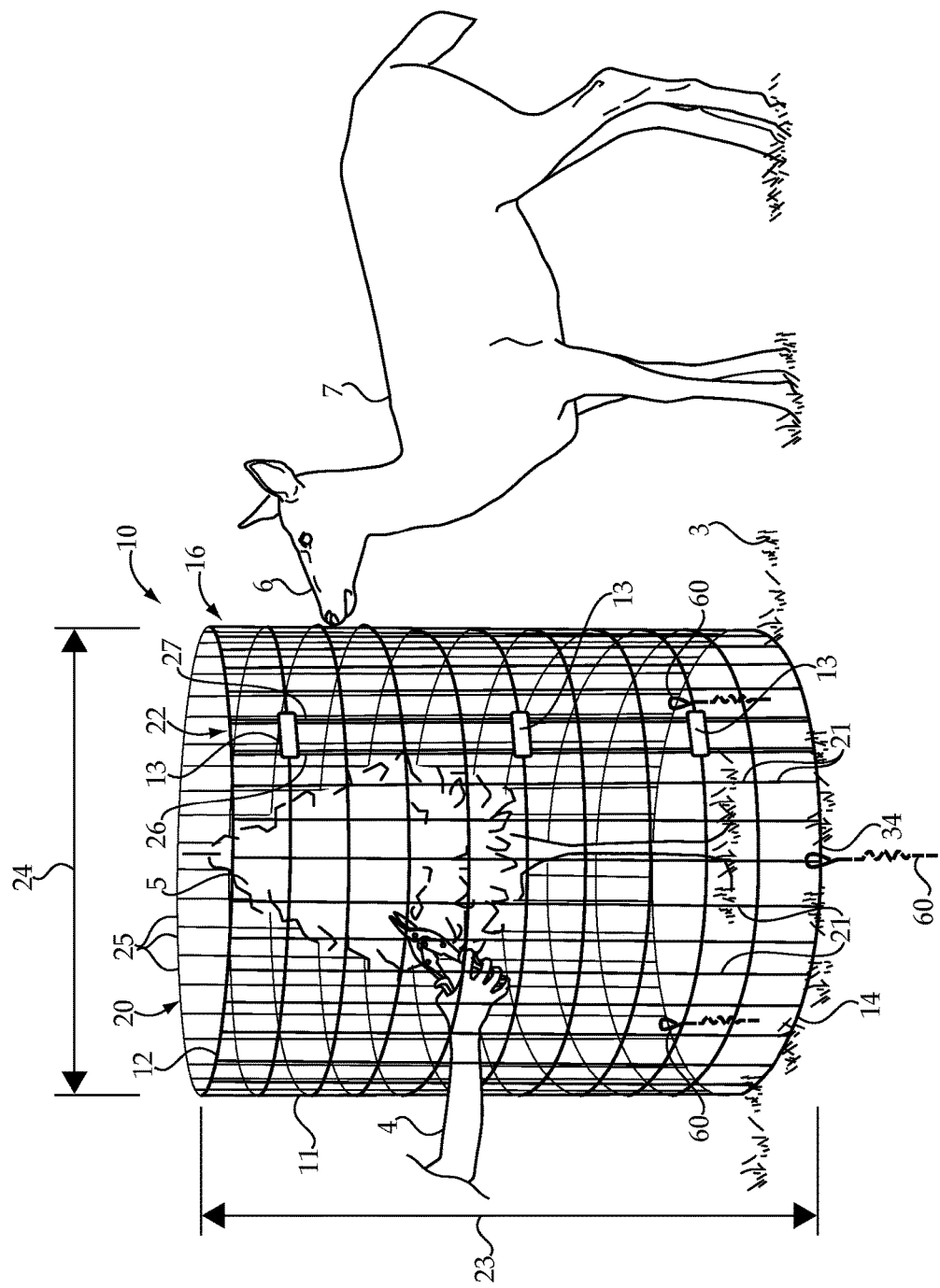
FIG. 1 is a perspective view of the plant protection/deer exclusion enclosure of the present disclosure.
Figure 2:
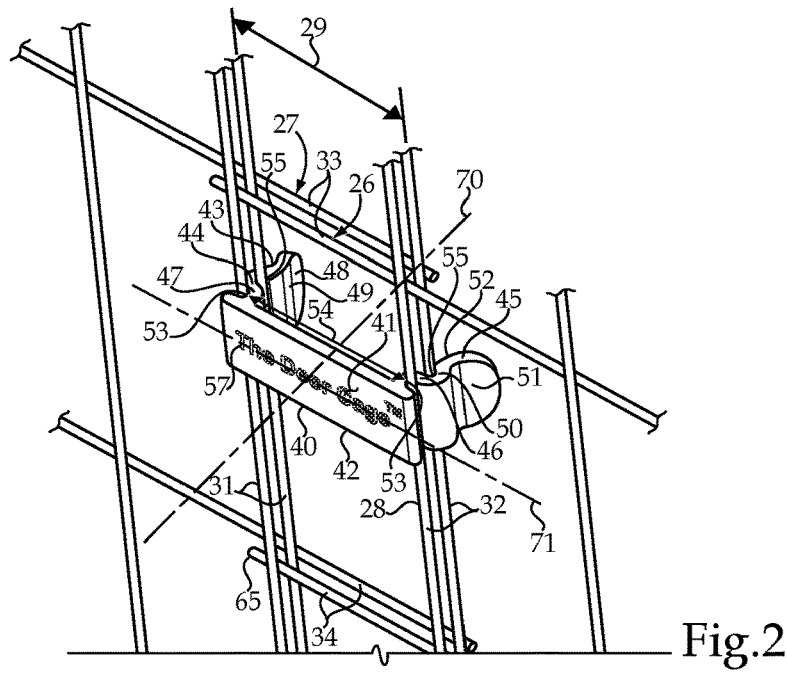
FIG. 2 is a enlarged partial isometric view of the enclosure of FIG. 1.

Referring to FIGS. 1-5, a plant protection/deer exclusion enclosure 10 includes a segment of fencing 11 that defines a grid 20 of rectangular openings 21. The segment of fencing 11 has an overlapping spiral configuration 22 that defines in an enclosed cylindrical volume 12 with a height 23 that is greater than a diameter 24. The grid 20 includes a plurality of columns 25 of the rectangular openings 21 bound on one end by a first column 26, and bound on an opposite end by a last column 27. The overlapping spiral configuration 22 includes the first column 26 being positioned radially outside, and in superimposed alignment with, the last column 27. A plurality of fasteners 13 connect the first column 26 to the last column 27 in the superimposed alignment. Each of the rectangular openings 21 is defined by a first side wire 31, a second side wire 32, a top wire 33 and a bottom wire 34. Each of the fasteners 13 is in contact with the first side wire 31 and the second side wire 32 of a rectangular opening 21 of the first column 26, and also in contact with the first side wire 31 and the second side wire 32 of a rectangular opening 21 of last column 27.

Each of the fasteners 13 is an integral single component 58 molded from a suitable plastic material with a shape that is symmetrical about two perpendicular axes 70, 71. Each of the fasteners 13 includes a cross piece 40 with a rectangular shaped message surface 41 positioned between the first side wire 31 and the second side wire 32. The rectangular shaped message surface 41 faces away from the cylindrical volume 12, and has a long side 42 oriented perpendicular to a long side 28 of the rectangular opening 21. Each of the fasteners 13 has a first extension 43 extending into the cylindrical volume 12 and connected to the cross piece 40 by a living hinge 44. Each of the fasteners 13 also has its second extension 45 extending into the cylindrical volume 12 and connected to the cross piece 40 by a second living hinge 46. The first extension 43 has a first S-shaped segment 47 and a first tab 48 with a first guide surface 49. The second extension 45 has a second S-shaped segment 50 and a second tab 51 with a second guide surface 52. The cross piece 40 and each of the first extension 43 and second extension 45 define a respective outward wire receiving groove 53. The outward wire receiving grooves 53 open away from each other and are spaced from each other a fixed distance 54 corresponding to a distance 29 between the first side wire 31 and the second side wire 32. Each of the first and second S-shaped segments 47 and 50 defines a respective inward receiving groove 55. The respective inward receiving grooves 55 open toward each other and are spaced from each other an expandable distance 56 that expands responsive to deformation of at least one of the first living hinge 44 and the second living hinge 46. The expandable distance 56 corresponds to the distance between the first side wire 31 and the second side wire 32, when the living hinge(s) 44, 46 are un-deformed.

Figure 3:
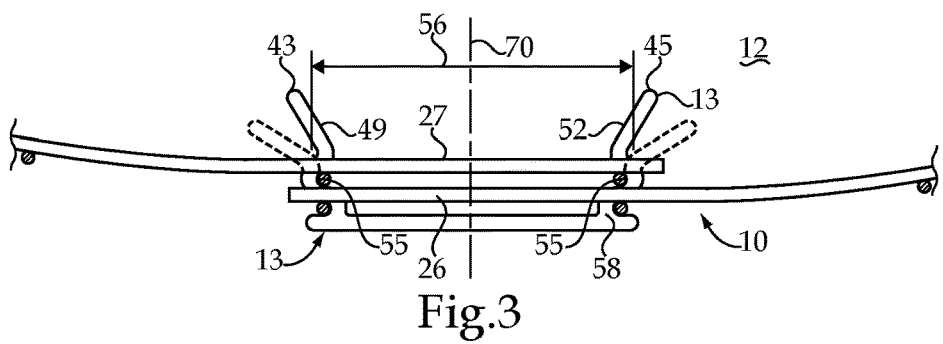
FIG. 3 is a partial top sectioned view of the enclosure of FIG. 1.
Figure 4:
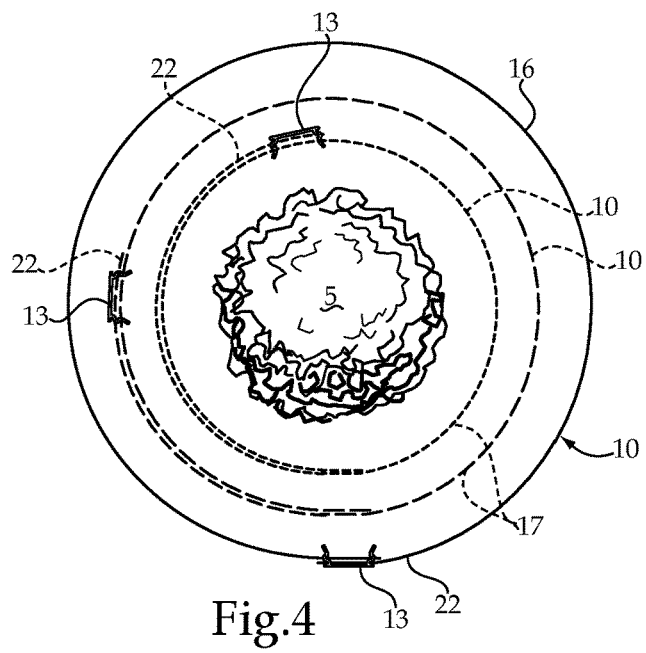
FIG. 4 is a top view of the enclosure of FIG. 1, with two smaller diameter configurations also shown.
Figure 5:
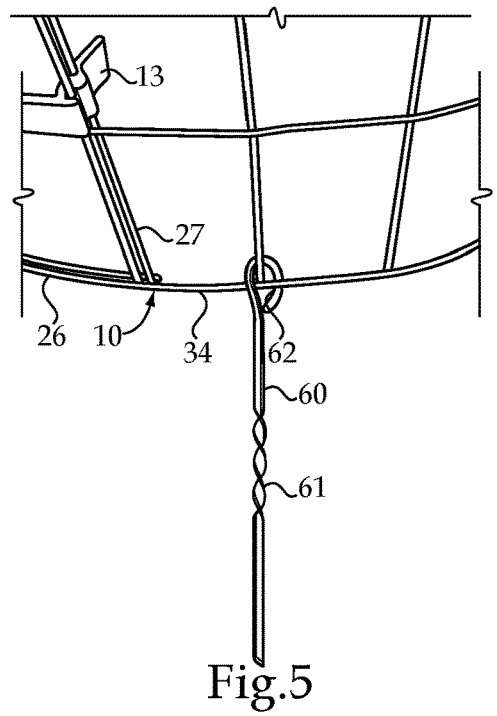
FIG. 5 is a partial perspective view of the enclosure of FIG. 1.
Figure 7:
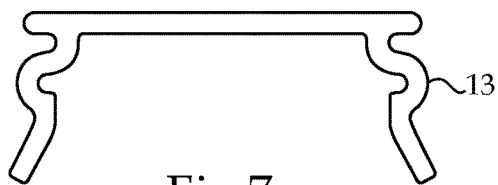
FIG. 7 is a top view of the fastener of FIG. 6.
Figure 8:
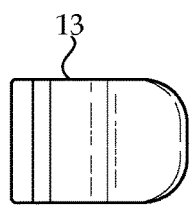
FIG. 8 is a left side view of the fastener of FIG. 6.
Figure 6:
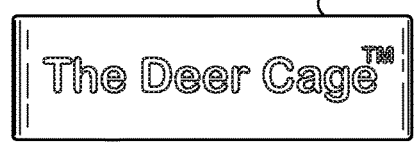
FIG. 6 is a front view of a fastener for the enclosure of FIG. 1.
Figure 9:
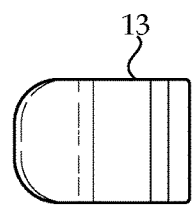
FIG. 9 is a right side view of the fastener of FIG. 6.
Figure 10:
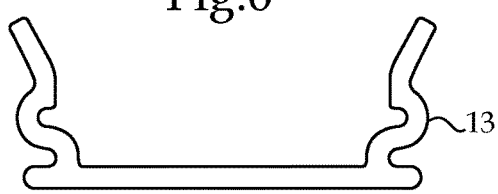
FIG. 10 is a bottom view of the fastener of FIG. 6.
Figure 11:
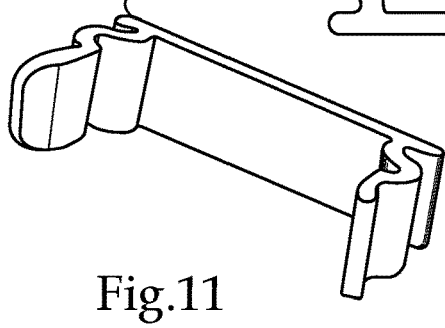
FIG. 11 is an isometric back side view of the fastener of FIG. 6.

Each of the fasteners 13 is affixed to the first column 26 at one of the rectangular openings 21 via the outward wire receiving grooves 53. The fastener 13 is also removably attached to the last column 27 at one of the rectangular openings 21 via the inward wire receiving grooves 55. Each of the fasteners 13 is detachable from the last column 27 responsive to deformation of at least one of the living hinges 44 and 46 to move the first tab 48 away from the second tab 51. Those skilled in the art will appreciate that due to the shape of the fasteners, each of the fasteners 13 is slidable between the top wire 23 and the bottom wire 34 of the respective rectangular opening 21. Referring specifically to FIG. 3, those skilled in the art will appreciate that the respective tabs 48, 51 and the respective guide surfaces 49, 52 are spaced apart more than the distance 29 between the first side wire 31 and the second side wire 32. This configurations allows the side wires 31 and 32 to contact the respective guide surfaces 49 and 52 to urge extensions 43 and 45 apart about living hinges 44 and 46 to connect the fastener 13 to the rectangular opening 21 associated with the last column 27, or one of the other columns if the enclosure 10 is in a smaller diameter configuration.

The enclosure 10 may also include at least three ground attachment stakes 60 affixed to a ground contact edge 14 of the fencing 11 via a formed loop that allows the respective stake 60 to pivot about the bottom wire 34 of the ground contact edge 14. Preferably, the ground attachment stakes 60 are equally spaced from one another (120° apart) in the overlapping spiral configuration 22. The ground attachment stakes 60 are shaped to firmly hold the plant protection/deer exclusion enclosure 10 in place when staked to ground 3, but are removable from the ground to relocate the enclosure 10 elsewhere.

Each of the rectangular openings 21 is identical in size and sized to allow passage of a hand 4 therethrough to tend a plant 5 positioned in the cylindrical volume 12, but too small to allow a head 6 of a deer 7 to pass through to access the plant 5. In one specific embodiment, the rectangular openings may be about 2 inches by about 4 inches. The term "about" means that the identified number is rounded to a single significant digit. As stated before, 2×4 inches effectively blocks all access by deer to contents within the cylindrical volume 12, while allowing an average sized male hand 4 to reach into the cylindrical volume 12 for pruning, mulching, weeding, harvesting, etc. This sizing thus eliminates the need to dismantle the enclosure 10 whenever the plant(s) 5 within needs tending. In the specific embodiment shown, the height 23 is about 4 feet and the diameter 24 is about 3 feet. This height effectively blocks at least 90% of browsing and 100% of rubbing by deer, while allowing for easy installation and also allows use in a variety of other functions, such as a tomato cage or a compost bin. The diameter of about 3 feet creates a broad enough expanse to enclose most vulnerable trees and shrubs, while maintaining a structural rigidity of the enclosure 10 that allows the cylindrical volume 12 to stand firm with only three ground attachment stakes 60 that are mostly hidden from view when staked to the ground 3. This staking strategy eliminates the need for long vertical poles that can compromise the aesthetic unity of the enclosure 10. Each of the ground attachment stakes 60 may be about seven inches long and have a twisted cross section 61. The stakes 60 effectively hold the enclosure 10 flush to the ground 3, help maintain the structural integrity of the enclosure 10, and keep the enclosure 10 from being either knocked over or lifted up. The strength and holding power of each ground attachment stake 60 is enhanced by providing each stake 60 with a twisted cross section 61, that may be in the form of a square cross section that changes in orientation along the length of the stake 60 to provided a twisted skew effect. Testing has shown that only three ground attachment stakes 60 are generally necessary in order to protect the enclosure 10 from assault from all angles.

In the illustrated embodiment, the enclosure 10 includes exactly three fasteners 13. While two may be sufficient, the third fastener 13 adds extra strength where the two end columns 26 and 27 meet, and the third may provide an extra fastener 13 in case one is lost. Four or more fasteners 13 would also fall within the scope of the present disclosure. In the illustrated embodiment, the fencing 11 is shown as welded 14 gauge wire fencing coated with a green polymer. Testing has shown that 14 gauge welded wire fencing 11 provides adequate structural rigidity against deer pressure, while allowing for easy manipulation during the installment process of the enclosure 10. The green polymer coating not only protects the underlying wire against rust, but also minimizes visual impact of the enclosure 10 in an outdoor environment. Testing has shown that 16 gauge wire fencing may be too flexible, while 12 gauge fencing may be too rigid. Although not necessary, the rectangular shaped message surface 41 of each fastener 13 may bear a company trademark or other identifier 57. Fastener 13 may be initially attached to first column 26 by positioning the fastener 13 in the relevant rectangular opening 21, and then rotating until side wires 31, 32 click into the respective outward receiving grooves 53.

Although FIG. 1 shows the enclosure 10 with the first column 26 and the last column 27 in the overlapping spiral configuration 22 in superimposed alignment with each other, the enclosure 10 may also assume a limited integer number of smaller diameter configurations 17. FIG. 1 shows enclosure 10 in a large diameter configuration 16. Because respective columns 25 must be arranged in superimposed alignment in order for the fasteners 13 to properly connect, each of the smaller diameter configurations 17 differs in circumference by the distance 29 between the first side wire 31 and the second side wire 32. The overlapping spiral configuration 22 includes the first column 26 being positioned radially outside, and in superimposed alignment with, the last column 27 in the large diameter configuration 16. The overlapping spiral configuration 22 includes the first column 26 being positioned radially outside, and in superimposed alignment with one of the columns 25 other than the last column 27 in one of the integer number of smaller diameter configurations 17.

INDUSTRIAL APPLICABILITY

The present disclosure finds general applicability to enclosures to protect plants from deer browsing and rubbing. The present disclosure finds specific applicability for protecting smaller and more vulnerable trees and shrubs from deer. Finally, the present disclosure finds potential applicability as a tomato enclosure, an enclosure to protect plants in containers, and also possibly as a compost bin. Those with skill in the art will appreciate that two or more enclosures may also be connected to one another to create a larger enclosure.

The fasteners 23 may be molded from a suitable plastic material with ultraviolet resistant plastic. Because the fasteners 13 are affixed to the first column 26, the fasteners 13 stay with the enclosure 10 during shipping, initial set up and relocation of enclosure 10. In other words, the fasteners as well as the ground engagement stakes 60, which are permanently affixed to the ground contact edge 14 of the enclosure 10 allow for no loose parts and no assembly required on the part of the consumer. With regard to the length of the ground attachment stake 60, 7 inches of twisted cross section has shown the ability to reliably and stably hold the enclosure in a stable configuration. Tests have shown that 5 inch length stakes are insufficient for security while 9 inch stakes can become too hard to drive into hard soil without providing much extra holding power. The superimposed alignment of the columns 25 facilitated by the fasteners 13 makes the rigidity and flexibility of the attachment overlapping columns 25 similar in performance to all of the other columns 25 that make up the cylindrical enclosure 12.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

LIST OF ELEMENTS 3. ground
4. hand
5. plant
6. head
7. deer
10. plant protection/deer exclusion enclosure
11. segment of fencing
12. enclosed cylindrical volume
13. fasteners
14. ground contact edge
16. large diameter configuration
17. smaller diameter configurations
20. grid
21. rectangular openings
22. overlapping spiral configuration
23. height
24. diameter
25. columns
26. first column
27. last column
28. long side
29. distance
31. first side wire
32. second side wire
33. top wire
34. bottom wire
40. cross piece
41. rectangular shaped message surface
42. long side
43. first extension
44. first living hinge
45. second extension
46. second living hinge
47. first s-shaped segment
48. first tab
49. first guide surface
50. second s-shaped segment
51. second tab
52. second guide surface
53. outward wire receiving groove
54. fixed distance
55. inward wire receiving groove
56. expandable distance
57. identifier
58. integral single component
60. ground attachment stakes
61. twisted cross section
70. axis
71. Axis

What is claimed is:

1. A plant protection/deer exclusion enclosure comprising:
   a segment of fencing that defines a grid of rectangular openings;
   the segment of fencing having an overlapping configuration that defines an enclosed cylindrical volume with a height that is greater than a diameter;
   the grid includes a plurality of columns of the rectangular openings bound on one end by a first column, and bound on an opposite end by a last column;
   the overlapping configuration includes the first column being positioned radially outside, and in superimposed alignment with, the last column;
   a plurality of fasteners that connect the first column to the last column in the superimposed alignment;
   each of the rectangular openings being defined by a first side wire, a second side wire, a top wire and a bottom wire;
   each of the fasteners being in contact with. the first side wire and the second side wire of a rectangular opening of the first column, and also in contact with the first side wire and the second side wire of a rectangular opening of the last column;
   wherein each of the fasteners includes a cross piece with a rectangular shaped message surface positioned between the first wire side and the second wire side, facing away from the cylindrical volume, and having a long side oriented perpendicular to a. long side of the rectangular opening;
   each of the fasteners has a shape that is symmetrical about two perpendicular axes;

wherein each of the fasteners has a first extension extending into the cylindrical volume and connected to the cross piece by a first living hinge, and a second extension extending into the cylindrical volume and connected to the cross piece by a second living hinge; wherein the first extension has a first S-shaped segment and a first tab with a first guide surface; the second extension has a second S-shaped segment and a second tab with a second guide surface; the cross piece and each of the first extension and the second extension defines a respective outward wire receiving groove, and the outward wire receiving grooves open away from each other and are spaced from each other a fixed distance corresponding to a distance between the first wire side and the second wire side; and each of the first and second S-shaped segments defines a respective inward wire receiving groove, and the respective inward wire receiving grooves open toward each other and are spaced from each other an expandable distance that expands responsive to deformation of at least one of the first living hinge and the second living hinge, and the expandable distance corresponding to the distance between the first side wire and the second side wire when the living hinge is undeformed.

2. The plant protection/deer exclusion enclosure of claim 1 wherein each of the fasteners is affixed to the first column at one of the rectangular openings via the outward wire receiving grooves;

each of the fasteners is removably attached to the last column at one of the rectangular openings via the inward wire receiving grooves;

and each of the fasteners being detachable from the last column responsive to deformation of at least one of the living hinges to move the first tab away from the second tab.

3. The plant protection/deer exclusion enclosure of claim 2 wherein each of the fasteners is slidable between the top wire and the bottom wire.

4. The plant protection/deer exclusion enclosure of claim 3 including at least three ground attachment stakes affixed to a ground contact edge of the fencing, and being equally spaced from one another in the overlapping configuration; and wherein the ground attachment stakes are shaped to firmly hold the plant protection/deer exclusion enclosure firmly in place when staked to ground, but being removable from the ground to relocate the plant protection/deer exclusion enclosure.

5. The plant protection/deer exclusion enclosure of claim 4 wherein each of the rectangular openings is identical in size and sized to allow passage of a hand there through to tend a plant positioned in the cylindrical volume, but too small to allow a head of a deer to pass through to access the plant.

6. The plant protection/deer exclusion enclosure of claim 5 wherein the rectangular openings are about 2 inches by about 4 inches;

the height is about 4 feet;
the diameter is about 3 feet;
each of the stakes has a twisted cross section about 7 inches long;
the plurality of fasteners is exactly three fasteners; and
the fencing is welded 14 gauge wire fencing coated with a green polymer.

7. The plant protection/deer exclusion enclosure of claim 6 wherein the rectangular shaped message surface bears a company identifier.

8. A plant protection/deer exclusion enclosure comprising:

a segment of fencing that defines a grid of rectangular openings the segment of fencing having an overlapping configuration that defines an enclosed cylindrical volume with a height that is greater than a diameter;

the grid includes a plurality of columns of the rectangular openings bound on one end by a first column, and bound on an opposite end by a last column;

the overlapping configuration includes the first column being positioned radially outside, and in superimposed alignment with, the last column in a large diameter configuration;

the overlapping configuration includes the first column being positioned radially outside, and in superimposed alignment with, one of the columns other than the last column in one of an integer number of smaller diameter configurations:

a plurality of fasteners affixed to the first column and removably attached to the last column and the one of the columns other than the last column in the large diameter configuration and one of the small diameter configurations respectively;

each of the rectangular openings being defined by a first side wire, a second side wire, a top wire and a bottom wire;

each of the fasteners is an integral single component with a shape that is symmetrical about two perpendicular axes, and includes first and second extensions connected to a cross piece by first and second living hinges, respectively;

at least three ground attachment stakes affixed to a ground contact edge of the fencing, and the overlapping configuration is limited to the large diameter configuration and the integer number of smaller diameter configurations;

wherein each of the fasteners is in contact with the first side wire and the second side wire of a rectangular opening of the first column, and also in contact with the first side wire and the second side wire of a rectangular opening of the last column in the large diameter configuration or the one of the columns other than the last column in one of the smaller of smaller diameter configurations;

wherein the cross piece has a rectangular shaped message surface positioned between the first wire side and the second wire side, faced away from the cylindrical volume, and has a long side oriented perpendicular to a long side of the rectangular opening;

wherein the first extension has a first S-shaped segment and a first tab with a first guide surface;

the second extension has a second S-shaped segment and a second tab with a second guide surface;

the cross piece and each of the first extension and the second extension defines a respective outward wire receiving groove, and the outward wire receiving grooves open away from each other and are spaced from each other a fixed distance corresponding to the distance between the first wire side and the second wire side; and each of the first and second S-shaped segments defines a respective inward wire receiving groove, and the respective inward wire receiving grooves open toward each other and are spaced from each other an expandable distance that expands responsive to deformation of at least one of the first living hinge and the second living hinge, and the expandable distance corresponding to a distance between the first wire side and the second wire side when the living hinge is undeformed.

9. The plant protection/deer exclusion enclosure of claim 8 wherein each of the fasteners is affixed to the first column at one of the rectangular openings via the outward wire receiving grooves;
   each of the fasteners is removably attached to the last column or one of the columns other than the last column at one of the rectangular openings via the inward wire receiving grooves;
   and each of the fasteners being detachable from the last column or one of the columns other than the last column responsive to deformation of at least one of the living hinges to move the first tab away from the second tab.

10. The plant protection/deer exclusion enclosure of claim 9 wherein each of the fasteners is slidable between the top wire and the bottom wire.

11. The plant protection/deer exclusion enclosure of claim 10 wherein each of the rectangular openings is identical in size and sized to allow passage of a hand there through to tend a plant positioned in the cylindrical volume, but too small to allow a head of a deer to pass through to access the plant.

12. The plant protection/deer exclusion enclosure of claim 11 wherein the rectangular openings are about 2 inches by about 4 inches;
   the height is about 4 feet;
   the diameter is about 3 feet;
   each of the stakes has a twisted cross section about 7 inches long;
   the plurality of fasteners is exactly three fasteners; and
   the fencing is welded 14 gauge wire fencing coated with a green polymer.

13. The plant protection/deer exclusion enclosure of claim 12 wherein the rectangular shaped message surface bears a company identifier.

* * * * *